United States Patent
Zhan

(10) Patent No.: US 10,030,792 B2
(45) Date of Patent: Jul. 24, 2018

(54) UNDERGROUND STEEL-CONCRETE STRUCTURE PIPELINE WITH SPIRAL COMPOSITE REINFORCEMENT RING ON INNER WALL AND MANUFACTURING METHOD THEREOF

(71) Applicant: NANJING LIANZHONG CONSTRUCTION ENGINEERING TECHNOLOGY CO., LTD., Nanjing, Jiangsu (CN)

(72) Inventor: Fujun Zhan, Nanjing (CN)

(73) Assignee: NANJING LIANZHONG CONSTRUCTION ENGINEERING TECHNOLOGY CO., LTD., Nanjing (CN)

(*) Notice: Subject to any disclaimer, the term of this patent is extended or adjusted under 35 U.S.C. 154(b) by 0 days.

(21) Appl. No.: 15/026,151

(22) PCT Filed: Dec. 30, 2014

(86) PCT No.: PCT/CN2014/095448
§ 371 (c)(1),
(2) Date: Mar. 30, 2016

(87) PCT Pub. No.: WO2016/058275
PCT Pub. Date: Apr. 21, 2016

(65) Prior Publication Data
US 2016/0319962 A1    Nov. 3, 2016

(30) Foreign Application Priority Data
Oct. 14, 2014  (CN) .......................... 2014 1 0541898

(51) Int. Cl.
*F16L 9/153*    (2006.01)
*E02D 29/045*   (2006.01)
(Continued)

(52) U.S. Cl.
CPC ............ *F16L 9/153* (2013.01); *E02D 29/045* (2013.01); *F16L 1/038* (2013.01); *F16L 9/165* (2013.01)

(58) Field of Classification Search
CPC . F16L 9/153; F16L 9/165; F16L 1/038; E02D 29/045
(Continued)

(56) References Cited

U.S. PATENT DOCUMENTS 3,812,884 A  *  5/1974  Breitfuss ................. F16L 1/028
                                                     138/105
3,955,600 A      5/1976  Tamburello
(Continued)

FOREIGN PATENT DOCUMENTS

CN       2668964 Y      1/2005
CN       1746434 A      3/2006
(Continued)

OTHER PUBLICATIONS

May 15, 2015 International Search Report issued in International Patent Application No. PCT/CN2014/095448.

*Primary Examiner* — Craig Schneider
*Assistant Examiner* — David Deal
(74) *Attorney, Agent, or Firm* — Oliff PLC

(57) ABSTRACT

An underground steel-concrete structure pipeline with a spiral composite reinforcement ring on an inner wall and a manufacturing method thereof. The pipeline includes a pipe body, multiple rows of concrete overflow holes spirally arranged on a pipe wall of the pipe body, a reinforcement ring capable of wrapping the concrete overflow holes, and concrete is filled in a hollow cavity between the reinforcement ring and the pipe wall to form a spiral concrete flow passage. The advantages are that the overall annular strength of the pipeline is reinforced by the reinforcement ring; the
(Continued)

concrete filled between the reinforcement ring and the inner wall of the pipe body improves the compressive strength of the pipe body; the concrete overflowing from the overflow holes on the pipe wall combines the pipe body with a pit; and the pipeline solves the difficulty of using large-size steel structure products in underground common pipeline projects.

16 Claims, 4 Drawing Sheets

(51) Int. Cl.
  *F16L 1/038* (2006.01)
  *F16L 9/16* (2006.01)
(58) Field of Classification Search
  USPC ....... 138/150, 144, 141, 140, 137, 153, 154, 138/173, 172, 122; 405/43–45, 47–49
  See application file for complete search history.

(56) References Cited

U.S. PATENT DOCUMENTS

| | | | | | |
|---|---|---|---|---|---|
| 4,365,911 | A | * | 12/1982 | Rossberg | .............. E01C 11/227 404/2 |
| 5,454,402 | A | * | 10/1995 | Andre | ...................... F16L 57/06 138/122 |
| 5,516,229 | A | * | 5/1996 | Atchley | .................. E03F 1/003 405/36 |
| 5,829,916 | A | * | 11/1998 | Evans | ................... E02B 11/005 405/43 |

FOREIGN PATENT DOCUMENTS

| | | |
|---|---|---|
| CN | 202559342 U | 11/2012 |
| CN | 202812511 U | 3/2013 |
| DE | 3619973 C1 | 11/1987 |

* cited by examiner

UNDERGROUND STEEL-CONCRETE STRUCTURE PIPELINE WITH SPIRAL COMPOSITE REINFORCEMENT RING ON INNER WALL AND MANUFACTURING METHOD THEREOF

FIELD OF THE INVENTION

The present invention relates to a pipeline and a manufacturing method thereof, and in particular to an underground steel-concrete structure pipeline with a spiral composite reinforcement ring on an inner wall and a manufacturing method thereof.

BACKGROUND OF THE INVENTION

In recent years, with the rapid development of urban rail transportation, communication, electric power and the like in our country, the demands on underground trenches and underground passages are more and more, most traditional underground common trenches are constructed in an open excavation method, and concrete is poured after excavation to form tubular structures, which are usually rectangular or round, and internal pipelines are installed after the poured concrete reaches the use intensity; and large pipelines are typically constructed in such manners as manpower construction, stone building, cement building and the like. Under normal circumstances, due to pipeline installation and pipeline erection of water, electricity, gas, communication and the like, the grounds are repeatedly excavated to result in waste of manpower and material resources, damage to the grounds and damage to various pipelines are not conducive to management and planning; meanwhile, the engineering quantity of the construction method and the structure thereof is large, the construction period is long, and the construction cost is higher; and in addition, during the construction, a part of structures at the tops of the pipelines must be completely cleared, and thus the additional land acquisition compensation fees are quite high.

Besides the open excavation method, a shield construction method is also available, it can be used for constructing underground passages without disturbing the structures above, even penetrating through high-rise buildings without disturbing surface buildings, controlling collapse instability of excavation faces and surrounding soil while tunneling and deslagging, splicing duct pieces in a machine to form linings and grouting after forming walls so as to build tunnels without disturbing the surrounding soil bodies. However, in the method, the pipeline linings are concrete sheet bars, which resist against the internal stress of the surrounding rocks by means of the strength and rigidity per se, therefore the thicknesses of the duct pieces need to be increased to improve the section strength of the pipelines in deeper underground engineering, and if the diameters of the pipelines are larger, the necessary engineering quantity is generally quite large, so that the construction operation is quite complex, the technical standard requirements are very high, and excessive steel and concrete are consumed to increase the cost.

Besides the above construction methods, a pipe-jacking construction method is also available, which is an underground pipeline construction method developed after the shield construction. By adopting the pipe-jacking construction method, surfaces are not excavated necessarily, and roads, railways, rivers, ground buildings, underground buildings and a variety of pipelines or the like can be passed through. The pipe-jacking construction depends on the thrust of a main jacking oil cylinder and relaying chambers between pipelines and the like to push a tool pipe or a heading machine from the interior of a working well into a receiving wheel to be lift by penetrating through soil layers; and meanwhile, pipelines following the tool pipe or the heading machine are buried between the two wells, in order to achieve a non-excavation underground pipeline construction method. The method is convenient to construct and is fast in process, but cement pipes are too heavy, and the wall thicknesses of the pipelines with ultra large pipe diameters are too large, so that pipe jacking is difficult, the manufacturing cost is high, and the construction is inconvenient.

SUMMARY OF THE INVENTION

Purpose of the Invention: a first purpose of the present invention is to provide an underground steel-concrete structure pipeline with a spiral composite reinforcement ring on an inner wall, which can improve the circumferential strength of a pipe body, improve the stability of the pipe body and reduce the construction difficulty, and a second purpose of the present invention is to provide a manufacturing method of the pipeline.

Technical Solution: the underground steel-concrete structure pipeline of the present invention includes a pipe body, multiple rows of concrete overflow holes are spirally arranged on a pipe wall of the pipe body along a circumferential direction, a reinforcement ring capable of wrapping the concrete overflow holes is correspondingly arranged on an inner wall of the pipe body, and concrete is filled in a hollow cavity between the reinforcement ring and the pipe wall to form a spiral concrete flow passage.

Wherein, the pipe body is a steel pipe body spirally winded by a main steel belt. Meanwhile, one or multiple rows of concrete overflow holes are arranged along a length direction of the main steel belt.

The reinforcement ring is a steel belt with a cambered, semicircular, rectangular or trapezoidal section, bent by a narrow steel belt. Meanwhile, the bent narrow steel belt is laminated with the main steel belt and covers the concrete overflow holes on the main steel belt, and the main steel belt and the narrow steel belt are winded along a spiral direction to form a steel pipe together.

In addition, the bent narrow steel belt forms two end faces, and the end faces are welded on the main steel belt.

The manufacturing method of the underground steel-concrete structure pipeline includes the following steps:

(1) preparing the pipeline and spirally forming the concrete overflow holes on the pipe wall of the pipe body along the circumferential direction; (2) preparing the narrow steel belt, and bending the narrow steel belt into a hollow reinforcement ring with a cambered, semicircular, rectangular or trapezoidal section; (3) spirally laminating the hollow reinforcement ring on the inner wall of the pipe body and wrapping the concrete overflow holes; and (4) respectively forming holes on the reinforcement ring on the head and tail ends of the pipeline placed in a pit, and pouring concrete from the hole on the head end, wherein the concrete fills a hollow cavity formed between the reinforcement ring and the inner wall of the pipe body along a spiral direction, meanwhile, the concrete flows out from the concrete overflow holes to fill a gap between the pipe wall and the pit, and when the concrete overflows from the hole on the tail end, the pouring operation is finished.

Wherein, the pipeline can be manufactured according to the following method: preparing the main steel belt, forming the concrete overflow holes along the length direction of the main steel belt, laminating the reinforcement ring on the main steel belt and covering the concrete overflow holes thereon, winding the main steel belt and the laminated reinforcement ring along the spiral direction together to form the pipeline with the reinforcement ring on the inner wall. Meanwhile, the pipelines are connected by a flange.

Principle of the Invention: the body of the pipeline is of a flexible structure, surrounding rocks can be fully used to form a pipe-soil effect with the main pipeline, the main pipeline and the surrounding soil are stressed together, serving as a skeleton of the pipe body, the reinforcement ring increases the second moment of area of the pipe wall, the filled concrete improves the compressive strength of the steel pipe, and the jacking force or traction of the pipeline can be reduced to the uttermost while guaranteeing the strength of the pipe body.

Beneficial Effects: compared with the prior art, the present invention has the remarkable advantages that: the overall annular strength of the pipeline is reinforced by the reinforcement ring; the concrete filled between the reinforcement ring and the inner wall of the pipe body further improves the compressive strength of the pipe body; the concrete overflowing from the overflow holes on the pipe wall combines the pipe body with the pit, so that the pipe body is stable and firm; the pipeline of the present invention solves the difficulty of using large-size steel structure products in underground common pipeline projects, underground comprehensive pipe racks and underground access roads; and meanwhile, the method of the present invention is easy to operate, simple and convenient to construct, and can be used for shortening the construction period and reducing the cost.

DETAILED DESCRIPTION OF THE EMBODIMENTS

Figure 1:
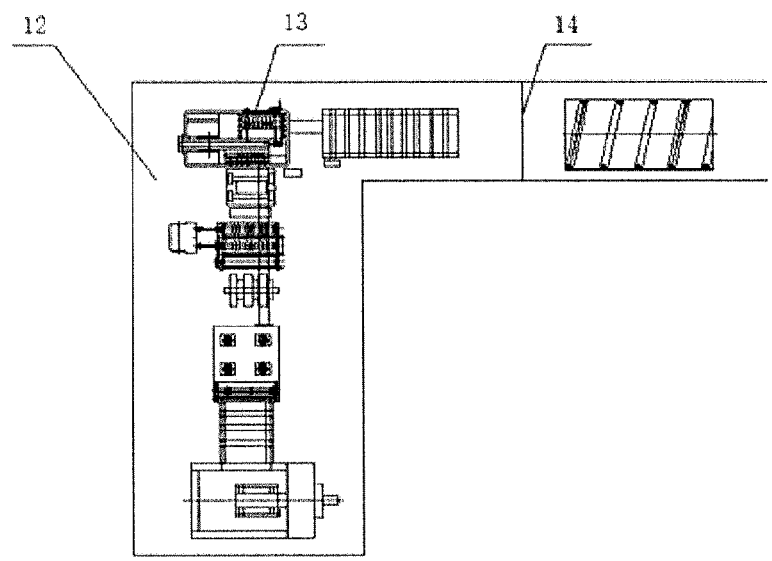
FIG. 1 is a schematic diagram of site construction of a pipeline of the present invention.

On a construction site as shown in FIG. 1, pipeline processing equipment 13 is installed and arranged in front of a pipeline tunneling opening 14 of a pit 12, earthwork excavation construction is started, of course, a pipeline can also be processed in a factory and is transported to the site, the pipeline of the present invention is preferably a steel pipe, the steel pipe can be winded by a flat steel plate, or a spiral steel pipe is winded by a steel belt, and the spiral steel pipe will be mainly described below in detail.

Figure 2:
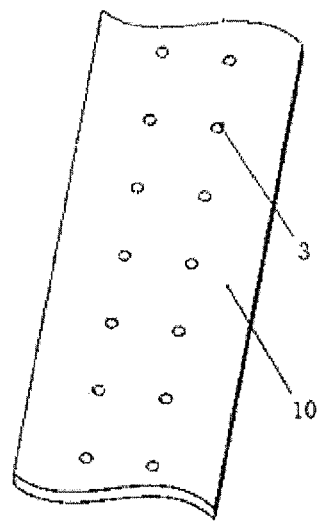
FIG. 2 is a schematic diagram of distribution of concrete overflow holes on a main steel belt.

According to the diameter of the pipeline to be manufactured, a forming angle of the pipeline processing equipment 13 is adjusted to a proper value. As shown in FIG. 2, a main steel belt 10 is prepared, the main steel belt is unreeled and leveled and is drilled according to a preset arrangement manner and size to form concrete overflow holes 3, for example, 2-3 rows of concrete overflow holes 3 can be drilled along a length direction of the main steel belt 10.

Figure 3:
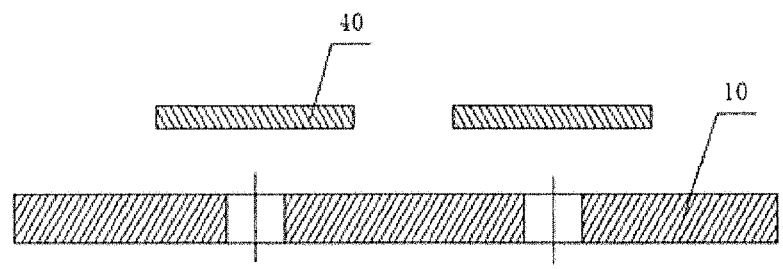
FIG. 3 is a schematic diagram of a placement position of a narrow steel belt.
Figure 4:
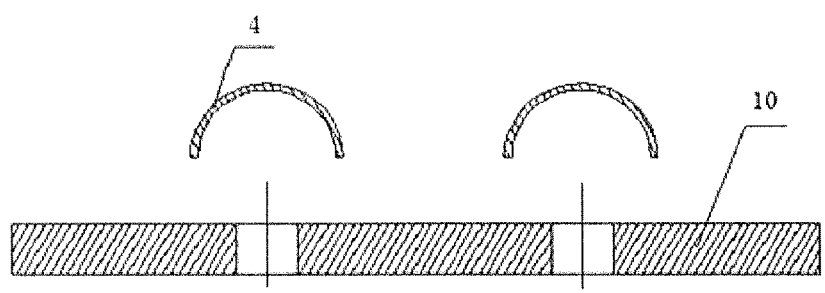
FIG. 4 is a schematic diagram of a structure of a reinforcement ring pressed by the narrow steel belt.

A narrow steel belt 40 is prepared, after unreeling, leveling, trimming and other procedures, the narrow steel belt is placed according to the position as shown in FIG. 3, and the narrow steel belt 40 is bent into a hollow reinforcement ring 4 with a semicircular cambered section by a bending mechanism, as shown in FIG. 4; and of course, the narrow steel belt can also be bent into a steel belt with a cambered, trapezoidal or square section. The reinforcement ring can improve the annular strength of the pipe body to prevent easy deformation of the steel pipe in a transportation process, and the thickness of a main steel plate can be decreased for more than a half, so that the cost is greatly saved; and meanwhile, since the reinforcement ring is combined with the pipe body, in the case of jacking stress, the reinforcement ring can provide a good constraint protection function for the pipe ends. In addition, besides helping to bear the soil pressure of the pipe body, by means of the hollow reinforcement ring, an underground railway track or a bridge and other bearing structures can also be arranged on the pipe body, and thus the use of the pipeline is expanded.

Figure 5:
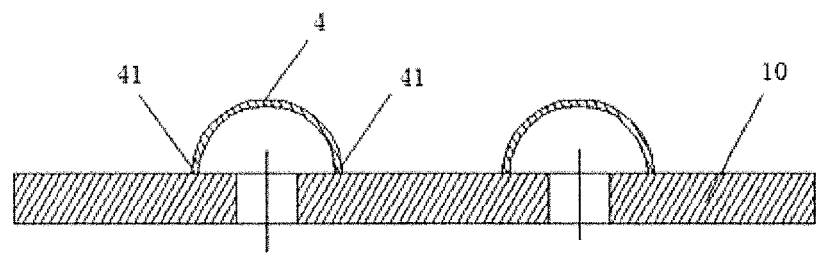
FIG. 5 is a schematic diagram of a structure after the main steel belt is combined with the reinforcement ring.

The reinforcement ring 4 is laminated with the main steel belt 10, wherein the narrow steel belt is bent to form two end faces 41, contact positions of the end faces 41 and the main steel belt 10 are laminated, for example, by a welding process, meanwhile, the reinforcement ring 4 covers or wraps the concrete overflow holes 3 on the main steel belt 10, and the centers of the concrete overflow holes 3 on the main steel belt 10 can be overlapped with the center of the reinforcement ring 4, as shown in FIG. 5.

Figure 6:
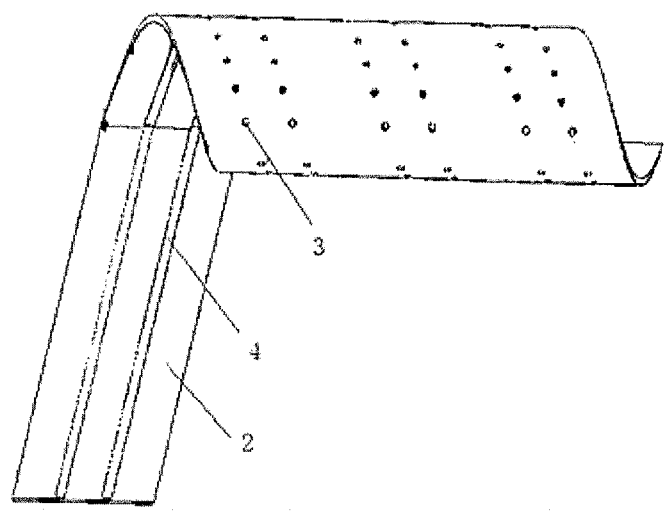
FIG. 6 is a schematic diagram of the main steel belt with the hollow reinforcement ring entering a three-roller rounding device.
Figure 7:
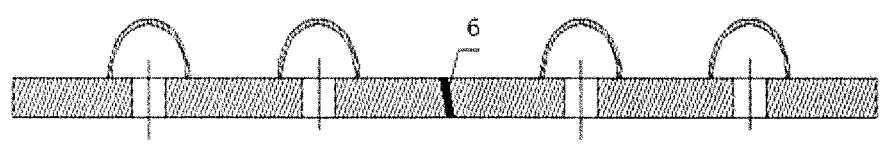
FIG. 7 is a schematic diagram of a position where a spiral weld of a formed pipeline is located.
Figure 8:
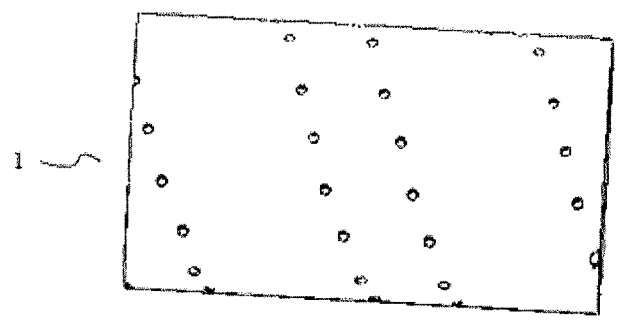
FIG. 8 is a schematic diagram of a structure of a spiral welded steel pipe.
Figure 9:
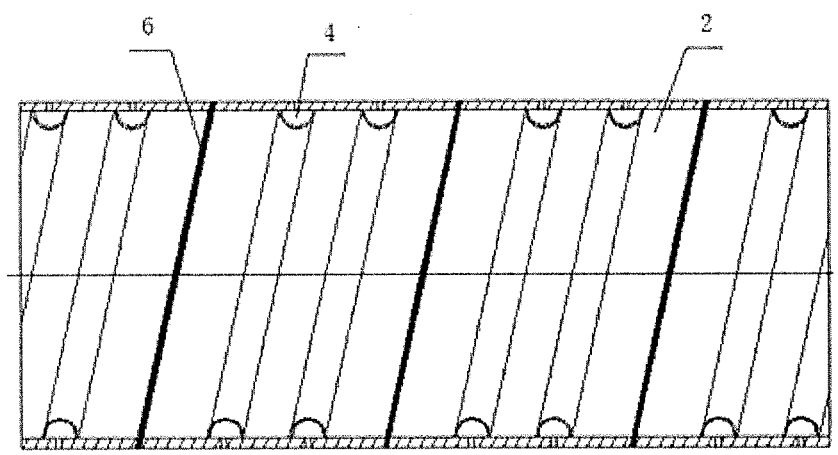
FIG. 9 is a schematic diagram of an internal structure of the spiral welded steel pipe.

As shown in FIG. 6, the main steel belt with the reinforcement ring is conveyed into a three-roller rounding device and is winded to a spiral steel pipe with a spiral hollow reinforcement ring on the inner wall according to a preset spiral angle; in the forming process, a spiral weld 6 of the steel pipe is welded at first, and the schematic diagram of the structure of the manufactured spiral welded steel pipe is as shown in FIG. 7, 8, 9. After winding the steel pipe to a certain length, the spiral welded steel pipe is cut off by a cutting device.

Figure 10:
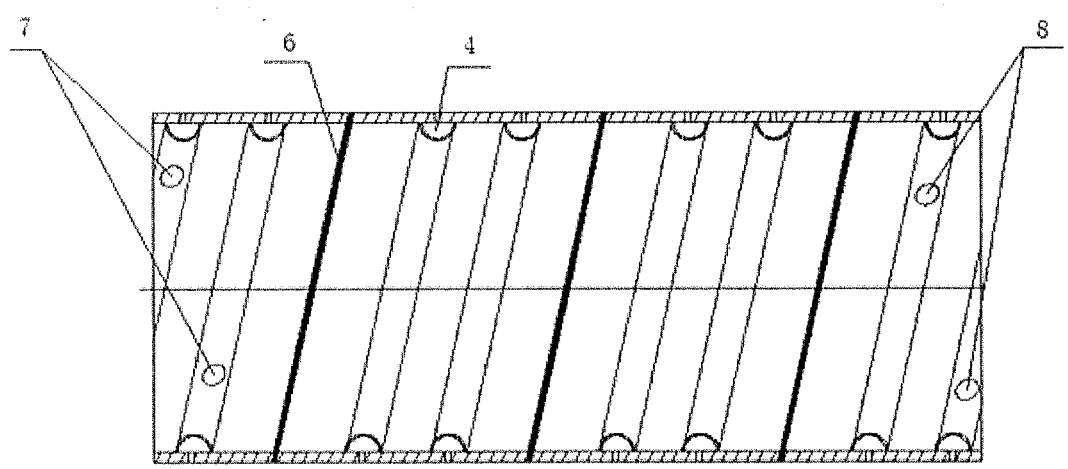
FIG. 10 is a schematic diagram of a position where a pouring hole is located.
Figure 11:
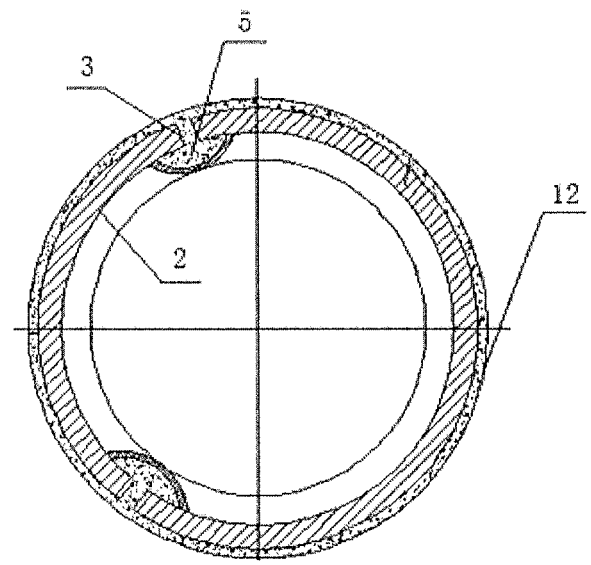
FIG. 11 is a sectional view of a pipe body after concrete is poured.

As shown in FIG. 10, 11, the pipeline is deployed in place in a jacking or traction manner, the pipeline with a smooth outer pipe wall and a small self weight of the pipe body in the present invention is conducive to incremental launching construction, and meanwhile, the pipeline can be used for improving the excavation speed and avoid traffic jam. After the position is corrected, pouring holes are formed in head and tail ends of the hollow reinforcement ring, concrete 5 is poured in a head end hole 7 at a high pressure, the concrete 5 enters a hollow cavity formed between the reinforcement ring 4 and the inner wall 2 of the pipe body 1 and flows along the spiral direction, meanwhile, the concrete flows out from the concrete overflow holes 3 on the pipe wall to fill a gap between the outer wall of the pipe body 1 and the pit 12, and when the concrete overflows from a tail end hole 8, the pouring operation is finished. In the above manufacturing process, the concrete is filled between the pit and the pipeline, so that the pipe body is more stable; meanwhile, in a concrete filling process, a huge vibration force guarantees full flow of the concrete to guarantee the pipe body and the concrete to form an entirety densely and uniformly; and in addition, high frequency vibration generates no deformation displacement or damage to the reinforcement ring or a pre-embedded member, so as to guarantee good mechanical properties in pipe jacking.

Figure 12:
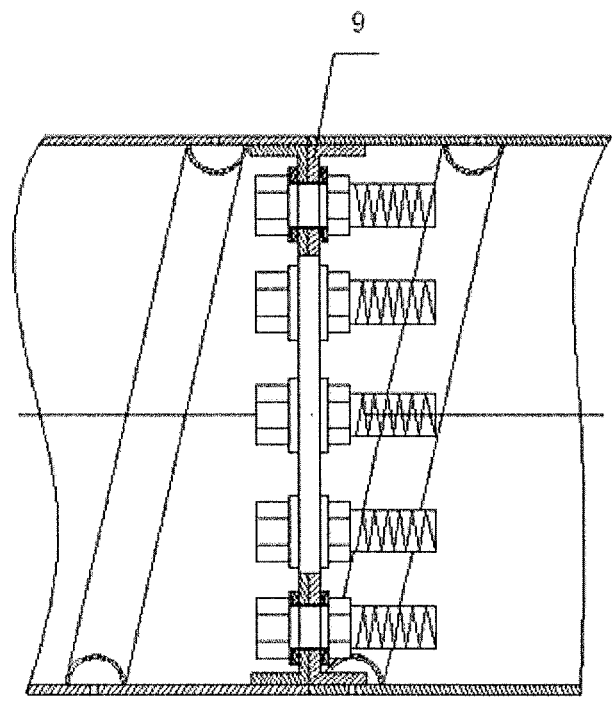
FIG. 12 is a schematic diagram of a structure of connecting a pipeline with a pipeline by a flange.

As shown in FIG. 12, during the construction of a second pipeline, the hollow cavity of the first pipeline is filled with the concrete, and the concrete gradually reaches the strength to guarantee the strength of the former segment of pipeline during jacking or traction; and meanwhile, pipelines are connected by a flange 9 to form the underground steel-concrete structure pipeline with the spiral composite reinforcement ring on the inner wall. The reinforcement ring filled with the concrete can further replace steel to bear forces, so that the steel consumption is reduced, and meanwhile, the pipeline can also be used as a sleeper of the underground railway track.

The pipeline of the present invention is applicable to underground common trenches, municipal common pipe galleries and underground collector pipes and the like, and meanwhile, the pipeline is buried deeply, which is larger than 10 meters.

The invention claimed is:

1. An underground steel-concrete structure pipeline with a spiral composite reinforcement ring on an inner wall, comprising a pipe body, wherein multiple rows of concrete overflow holes are spirally arranged on a pipe wall of the pipe body along a circumferential direction, a reinforcement ring capable of wrapping the concrete overflow holes is correspondingly arranged on an inner wall of the pipe body, and concrete is filled from the inner wall to an outside wall of the pipe body in the overflow holes and in a hollow cavity between the reinforcement ring and the pipe wall to form a spiral concrete flow passage.

2. The underground steel-concrete structure pipeline with the spiral composite reinforcement ring on the inner wall of claim 1, wherein the pipe body is a steel pipe body spirally winded by a main steel belt.

3. The underground steel-concrete structure pipeline with the spiral composite reinforcement ring on the inner wall of claim 2, wherein the concrete overflow holes are arranged along a length direction of the main steel belt.

4. The underground steel-concrete structure pipeline with the spiral composite reinforcement ring on the inner wall of claim 3, wherein the reinforcement ring is a steel belt with a cambered, semicircular, rectangular or trapezoidal section, bent by a narrow steel belt.

5. The underground steel-concrete structure pipeline with the spiral composite reinforcement ring on the inner wall of claim 4, wherein the bent narrow steel belt is laminated with the main steel belt and covers the concrete overflow holes on the main steel belt, and the main steel belt and the narrow steel belt are spirally winded together to form a steel pipe.

6. The underground steel-concrete structure pipeline with the spiral composite reinforcement ring on the inner wall of claim 5, wherein the bent narrow steel belt forms two end faces, and the end faces are welded on the main steel belt.

7. The underground steel-concrete structure pipeline with the spiral composite reinforcement ring on the inner wall of claim 2, wherein the reinforcement ring is a steel belt with a cambered, semicircular, rectangular or trapezoidal section, bent by a narrow steel belt.

8. The underground steel-concrete structure pipeline with the spiral composite reinforcement ring on the inner wall of claim 7, wherein the bent narrow steel belt is laminated with the main steel belt and covers the concrete overflow holes on the main steel belt, and the main steel belt and the narrow steel belt are spirally winded together to form a steel pipe.

9. The underground steel-concrete structure pipeline with the spiral composite reinforcement ring on the inner wall of claim 8, wherein the bent narrow steel belt forms two end faces, and the end faces are welded on the main steel belt.

10. The underground steel-concrete structure pipeline with the spiral composite reinforcement ring on the inner wall of claim 1, wherein the reinforcement ring is a steel belt with a cambered, semicircular, rectangular or trapezoidal section, bent by a narrow steel belt.

11. The underground steel-concrete structure pipeline with the spiral composite reinforcement ring on the inner wall of claim 10, wherein the bent narrow steel belt is laminated with the main steel belt and covers the concrete overflow holes on the main steel belt, and the main steel belt and the narrow steel belt are spirally winded together to form a steel pipe.

12. The underground steel-concrete structure pipeline with the spiral composite reinforcement ring on the inner wall of claim 11, wherein the bent narrow steel belt forms two end faces, and the end faces are welded on the main steel belt.

13. A manufacturing method of the underground steel-concrete structure pipeline with the spiral composite reinforcement ring on the inner wall of claim 1, comprising the following steps:
    (1) preparing the pipeline and spirally forming the concrete overflow holes on the pipe wall of the pipe body along the circumferential direction;
    (2) preparing the narrow steel belt, and bending the narrow steel belt to a hollow reinforcement ring with a cambered, semicircular, rectangular or trapezoidal section;
    (3) spirally laminating the hollow reinforcement ring on the inner wall of the pipe body and wrapping the concrete overflow holes; and
    (4) respectively forming pouring holes on the reinforcement rings on head and tail ends of the pipeline placed in a pit, and pouring concrete from the hole on the head end, wherein the concrete fills the hollow cavity formed between the reinforcement ring and the inner wall of the pipe body along the spiral direction, meanwhile, the concrete flows out from the concrete overflow holes to fill a gap between the pipe wall and the pit, and when the concrete overflows from the hole on the tail end, the pouring operation is finished.

14. The manufacturing method of the underground steel-concrete structure pipeline with the spiral composite reinforcement ring on the inner wall of claim 13, wherein the main steel belt is prepared, the concrete overflow holes are formed along the length direction of the main steel belt, the reinforcement ring is laminated on the main steel belt and covers the concrete overflow holes thereon, the main steel belt and the laminated reinforcement ring are winded along the spiral direction together to form the pipeline with the reinforcement ring on the inner wall.

15. The manufacturing method of the underground steel-concrete structure pipeline with the spiral composite reinforcement ring on the inner wall claim 14, wherein the pipelines are connected by a flange.

16. The manufacturing method of the underground steel-concrete structure pipeline with the spiral composite reinforcement ring on the inner wall of claim 13, wherein the pipelines are connected by a flange.

\* \* \* \* \*